Feb. 2, 1965          W. H. HAINER          3,168,261
CABLE WINDING MECHANISM
Filed March 29, 1963          3 Sheets-Sheet 1
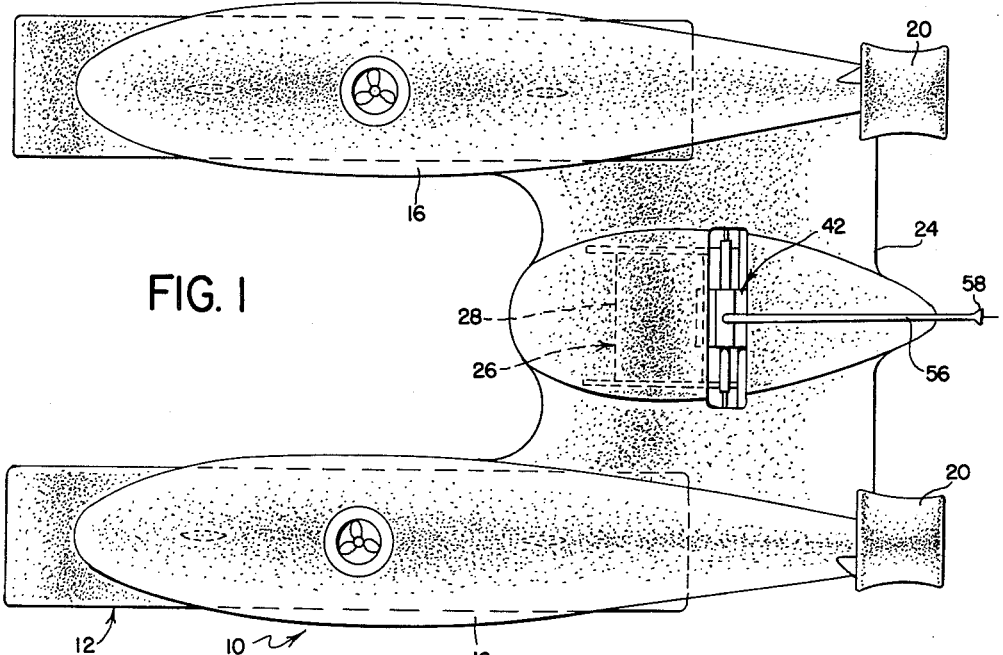
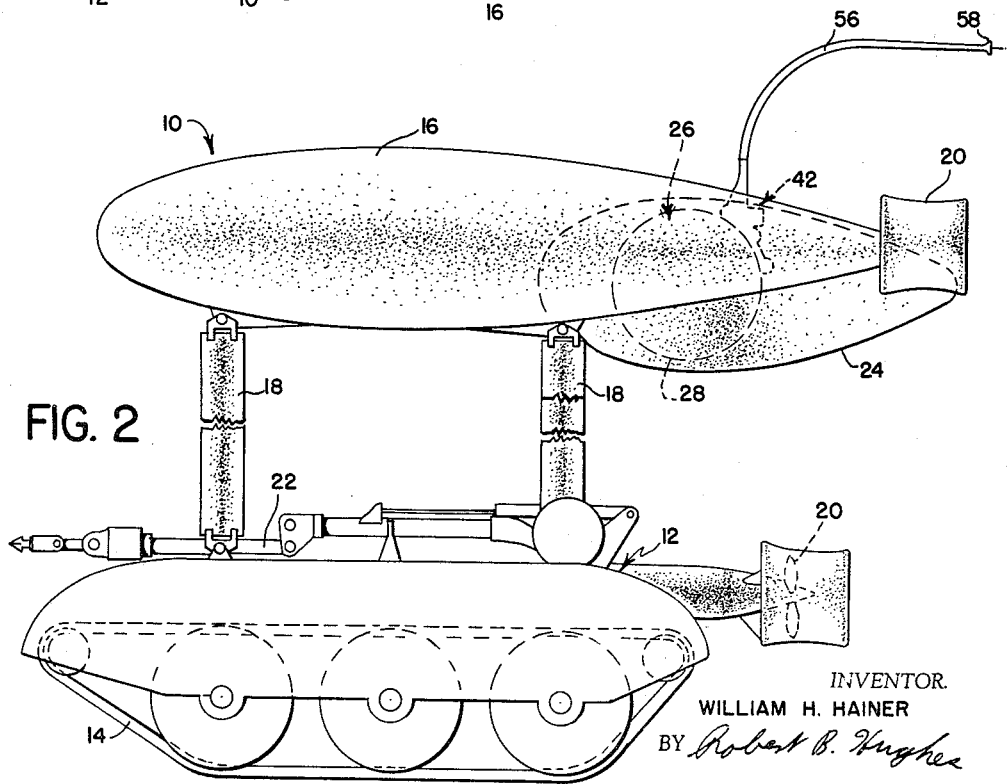
INVENTOR.
WILLIAM H. HAINER
BY Robert B. Hughes
ATTORNEY Feb. 2, 1965 W. H. HAINER 3,168,261
CABLE WINDING MECHANISM
Filed March 29, 1963 3 Sheets-Sheet 2
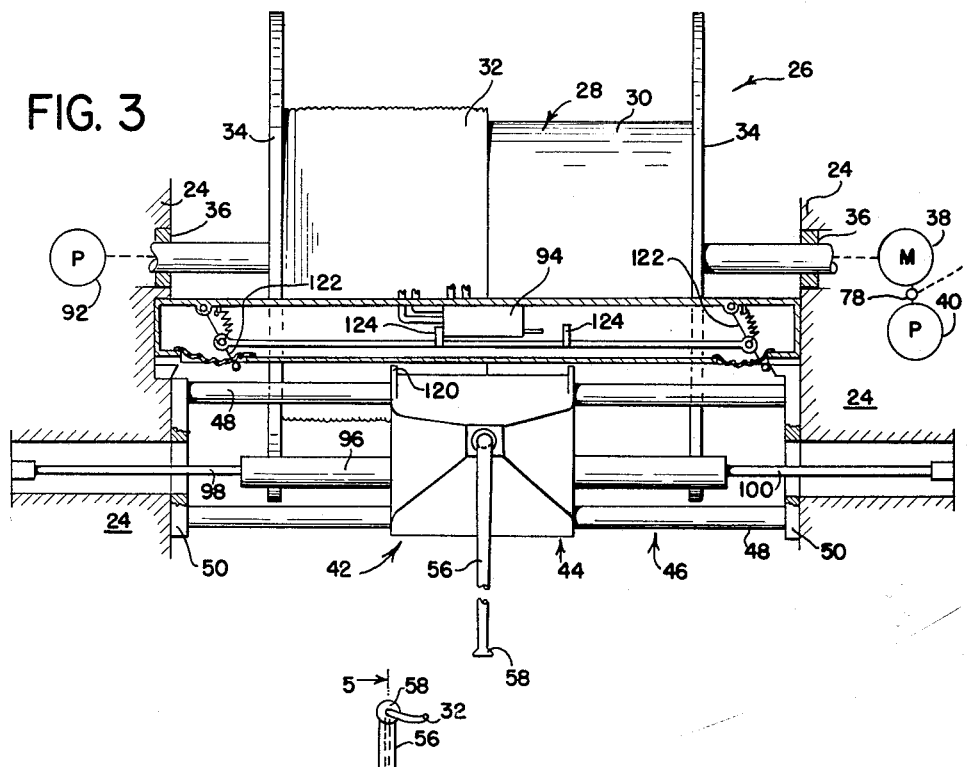
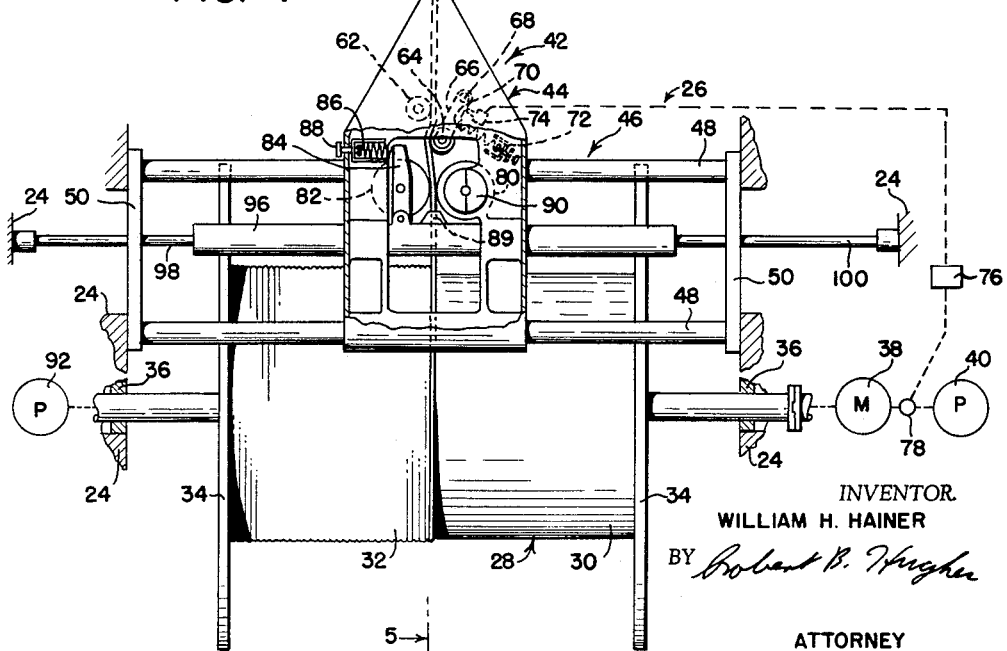
INVENTOR.
WILLIAM H. HAINER
BY Robert B. Hughes
ATTORNEY

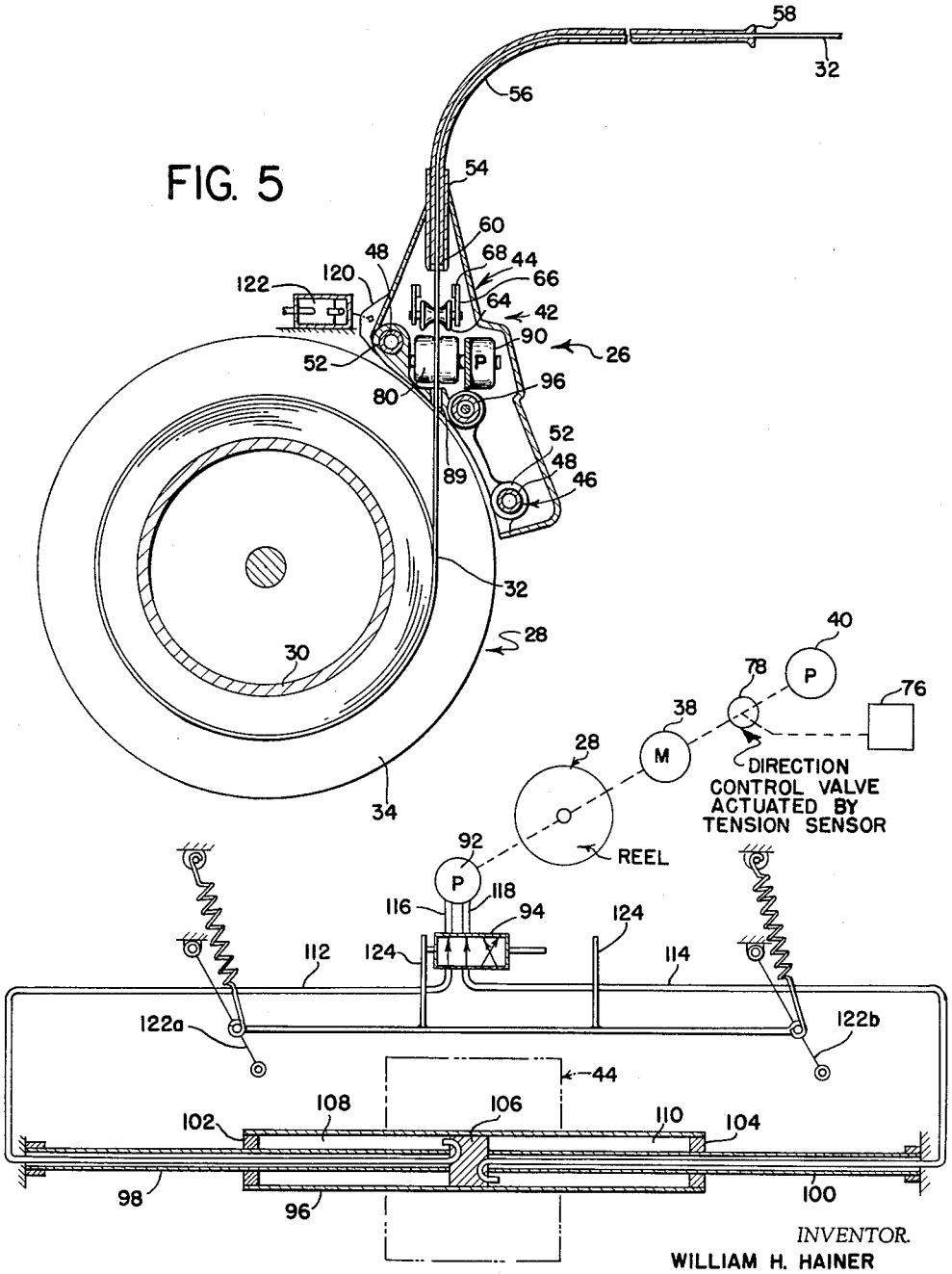

3,168,261
CABLE WINDING MECHANISM
William H. Hainer, St. Paul, Minn., assignor to General Mills, Inc., a corporation of Delaware
Filed Mar. 29, 1963, Ser. No. 269,088
4 Claims. (Cl. 242—86.51)

This invention relates to a cable winding mechanism, and more particularly to an apparatus for use on a remotely controlled vehicle, such as an underwater reconnaissance vehicle, to automatically reel in or pay out a control or power cable for the vehicle as it travels a course.

It is a general object of the present invention to provide such a cable winding mechanism which is relatively simple and compact, which performs reliably, which, when reeling cable in, properly winds the cable in even multiple layers upon a spool or drum, and, when paying out cable, properly dispenses the cable from said drum, and which, in reeling in and paying out cable, does so independently of the travel of the vehicle, by making the winding action of the drum responsive to tension on the cable.

In conjunction with this above-mentioned object is the further object of providing such a cable winding mechanism especially adapted for use in a remotely controlled underwater reconnaissance vehicle that is designed to travel over rough terrain of the ocean floor at relatively great depths (i.e. 500 feet or more) and be able to follow a relatively complex course over such terrain.

It is believed a clearer understanding of the apparatus to which the present invention relates, and of the problems which the invention purports to alleviate will be obtained by first describing briefly an underwater vehicle of the type for which the present invention is especially adapted and the problems in its operation.

Such a vehicle has a chassis which rests on a pair of tracks by which the vehicle is able to propel itself along the ocean floor. Pivotally connected to the chassis are a set of upstanding struts the upper ends of which are pivotally connected to a set of tanks which impart a lifting or buoying force to the vehicle. By properly moving these tanks by means of the supporting struts, the vehicle's center of buoyancy is placed over its center of gravity, and the entire vehicle is better able to be stabilized on its tracks so that it can travel over steeply sloped surfaces. Also, both the chassis and the tanks are provided with propellers to power the vehicle above the ocean floor, submarine fashion, in the event that it is desired to pass over a crevasse or other obstacle.

The vehicle is both controlled and powered electrically, this being accomplished by an electric cable leading from the vehicle to a suitable power and control source, such as a surface ship or possibly a shore station. While the vehicle, during a reconnaissance mission, may be following a maze-like course over the ocean floor, the cable will sometimes slide sideways over the ocean floor or become snagged on obstructions or vegetation. Since the cable has a total length of perhaps five miles, it may become strung out over the ocean floor along a rather unpredictable and complex path, quite different from that which the vehicle has travelled. Thus, there arise particular problems in reeling in the cable under these conditions, among such problems being that of guarding against the vehicle itself cutting across and severing the cable. It is for effective operations under conditions such as these that my invention purports to provide a practical cable winding apparatus.

In the accompanying drawings:

FIGURE 1 is a top plan view of a reconnaissance vehicle on which is mounted a cable winding mechanism embodying preferred teachings of my invention;

FIGURE 2 is a side elevational view thereof;

FIGURE 3 is a top plan view of the cable winding mechanism of my invention;

FIGURE 4 is a rear elevational view thereof;

FIGURE 5 is a fragmentary view taken partly in section along a line 5—5 of FIG. 4, and FIGURE 6 is a schematic drawing of the cable winding mechanism to illustrate the operation of the traverse mechanism used herein.

Referring now to FIGS. 1 and 2, numeral 10 designates generally an underwater vehicle carrying the cable winding apparatus of my invention. The generally U-shaped chassis 12 of this vehicle rides on a pair of endless tracks 14 which are positioned on opposite sides of the chassis. A set of stream-lined tanks 16 are supported above the chassis by a plurality of struts 18, which are pivotally connected by their lower ends to the chassis 12 and by their upper ends to the tanks 16. Ducted propellers 20 are mounted on both the chassis 12 and tanks 16 to provide propelling and steering means in addition to the tracks 14. If desired, suitable manipulating arms, such as those shown at 22, may be provided to perform various tasks in conjunction with a reconnaissance mission.

Extending between and fixed rigidly to the rear portions of the tanks 16 is a frame or structure 24, which, besides bracing the tanks 16 and permitting other functions in connection with the operation of the vehicle, also serves as a housing for the cable winding mechanism, generally designated 26. This mechanism 26 comprises a reel or drum 28 having a cylindrical portion 30 on which the power and control cable 32 is wound in multiple layers between two flanges 34 fixed to opposite sides of the cylinder 30.

The drum 28 is journal mounted as at 36 on the housing structure 24 about a transverse horizontal axis. To turn the drum 28, there is provided a suitable hydraulic motor driven by a pump, these components being indicated schematically at 38 and 40, respectively.

As part of the cable winding apparatus 26, there is provided a transverse mechanism, generally designated 42, which comprises a carriage 44 slidably mounted on a horizontal transverse guideway 46. This guideway 46 is conveniently formed as two parallel tubular bars 48 which are fixed by end cross braces 50 to the aforementioned vehicle housing structure 24, and which are engaged by suitable slide journals 52 of the carriage 44.

Rotatably secured in a vertically alined socket member 54 in the carriage 44 and extending upwardly therefrom is a resiliently flexible whip-like tubular guide rod 56 through which the cable 32 is directed into or out from the carriage 44. This rod 56 is desirably made of steel or glass and is sufficiently stiff so that normal cable tension will bend the rod 56 in a moderate curve (which, under normal operating conditions, will be about 90°) with the end tip 58 of the rod 56 being spaced above and away from the vehicle 10.

That portion of the cable 32 which is immediately below (i.e. toward the reel 28 from) the base end 60 of the rod 56 is engaged by a pair of tension sensing rollers 62 and 64. These rollers 62 and 64 are on opposite sides of, and spaced longitudinally with respect to, the cable 32, the upper roller 62 being mounted on a fixed axis with respect to carriage 44, and the lower roller 64 pressing yieldingly against the cable 32 so as to tend to deflect the same. The latter is conveniently accomplished by mounting the roller 64 on the free end of an arm 66 pivoted at 68 to the carriage 44, and urging this arm 66 toward the cable 32 by means of a spring 70. So that the deflecting force of the roller 64 against the cable 32 may be easily adjusted, one end of the spring 70 is secured to the arm 66, while the other end is connected to a screw adjustable member 72 on the carriage 44.

A suitable control switch 74 is mounted on the carriage 44 adjacent the pivot arm 66, and is so arranged as to be engaged thereby when a predetermined cable tension causes the cable 32 to push against the roller 64 in opposition to the spring 70, and move the arm 66 a specified location. This switch 74 is operatively connected to the pump and motor drive 40–38 to cause the drum 28 to remain stationary, or to either reel in or pay out cable in response to, respectively, a decrease or an increase in cable tension. This operative connection can be accomplished in any one of a number of suitable prior art methods, such as providing switch 74 with three operating positions, one position to cause fluid from the pump 40 to turn the motor 38 in a reeling in direction, a second position to reverse the flow to motor 38 so as to cause paying out of cable, and an intermediate position in which fluid from the pump 40 by-passes the motor 38 and hence causes no rotation of the drum 28. Since such control mechanisms are well known in the prior art, this control apparatus is merely indicated schematically in FIGS. 4 and 6 by showing an operative connection from switch 74 to a valve control device 76, which in turn is operatively connected to a valve 78 controlling flow from the pump 40 to the motor 38 in the above-described manner.

Mounted on the carriage 44 immediately below the lower tension sensing roller 64 are a pair of oppositely positioned drag rollers 80 and 82, which frictionally engage therebetween the cable 32. While one roller 80 is rotatably mounted on the carriage 44 about a fixed axis, the other 82 is mounted on a pivot arm 84 which is urged toward the roller 80 by a spring 86, the force of which spring may easily be varied by an adjusting screw 88. So that the minimum tension of the cable 32 being wound onto the drum 28 is maintained above a predetermined level, at least one of the rollers 80 and 82 is operatively connected to a small hydraulic drag pump 90 mounted on the carriage 44. The output of this pump 90 may be regulated so as to adjust the drag on the cable 32 and thus control the minimum tension thereon. Below the rollers 80 and 82, the carriage 44 is formed with opening 89 through which the cable 32 is guided onto or from the drum 28.

To drive the carriage 44 back and forth along the guideway 46 so that the cable 32 is evenly wound in multiple layers onto the drum 28, a positive displacement hydraulic pump, shown schematically at 92, is driven by the drum 28 to feed fluid through a reversing valve, shown schematically at 94, to a drive cylinder 96 fixed to, and thus movable with, the carriage 44. Fixed to opposite sides of the afore-mentioned vehicle housing structure 24 are a pair of piston rods 98 and 100, each of which extends through a related end wall 102 or 104 of the cylinder 96, to join to a common stationary piston 106, which partitions the cylinder 96 into two chambers 108 and 110.

Referring now specifically to FIG. 6, which shows schematically the operation of this carriage driving mechanism, it can readily be seen that one hydraulic line 112 leads from the reversing valve 94 through the piston rod 98 and piston 106 into the cylinder chamber 108, while a second line 114 leads from valve 94 through rod 100 and piston 106 into the other cylinder chamber 110. As fluid flows from the pump 92 into a line 116 through the valve 94, then through line 112 into the chamber 108, the carriage 44 (as seen in FIG. 6) will be caused to move to the left at a rate proportional to the rotational speed of the drum 28. Simultaneously, fluid will be forced out of the cylinder chamber 110 into line 114, then through the reversing valve 94 back to the pump 92 through a line 118. When the carriage 44 has travelled a predetermined distance along the axial length of the drum 28 so that a layer of cable 32 has been evenly wound thereon, a finger 120 projecting from the carriage 44 engages one side 122a of an over-center switch 122, which in turn has a catch finger 124 which moves revers-ing valve 94 to its other position and consequently reverses flow through lines 112 and 114. The result is that as cable continues to be wound onto the drum 28, the carriage 44 moves at the same predetermined rate (relative to the rotational speed of the drum 28) in the opposite direction along its guideway 46 so as to guide the cable 32 as a second layer thereof is being wound on the drum 28.

In operation, assuming that the vehicle 10 is travelling away from its power and control source, the cable 32 will experience an increase in tension and will bear against the yielding tension sensing roller 64 to cause the arm 66 to engage the control switch 74 and turn the motor 38 in a manner to pay out cable 32 from the drum 28. As cable is being so payed out, the pump 92 will be driven by the reel 28 to feed hydraulic fluid into the drive cylinder 96, this causing the carriage 44 to move along the guideway 46 at a predetermined rate in accordance with the rotational speed of the drum 28. When a layer of cable has payed out from the drum 28, the carriage 44 will engage the center throw switch 122 to reverse flow to the cylinder 96 and move the carriage 44 in the opposite direction, so that as a second layer of cable is being payed out, the carriage 44 will continue to properly guide the cable 32 from the drum 28.

When the vehicle 10 travels back toward its power and control source, slack will develop in the cable, which will permit the tension sensing roller 64 to further deflect the cable 32 and disengage the control switch 74 which in turn will reverse the motor 38 and turn the reel 28 in a direction to wind in cable. This will immediately reverse the pump 92 and hence, without moving the reversing valve 94, will reverse the direction of movement of carriage 44. The linear speed at which the drum 28 winds in cable will be somewhat greater than the maximum speed of the vehicle 10, to prevent the vehicle 10 from over-running the cable 32. However, if some undesirable slack does develop (as for example might be the case if the vehicle 10 perhaps travelled outwardly along a zig-zag course and were returning generally along a course more in a straight line), the drag rollers 80 and 82 will insure that there be a minimum tension exerted on the cable portion being wound onto the drum to prevent any unevenness of the cable layers being wound on the drum.

Also there will occasionally be brief surges or drops in cable tension, as for example, when the cable 32 snags on a piece of vegetation and then breaks free. The whip action of the rod 56 will compensate for such momentary variations in cable tension.

When the tension on the cable 32 is within the desired limits, the arm 66 will be moved to a position to hold the switch 74 in its intermediate position, in which case the drum 28 will remain stationary. As before stated, by manipulating the adjustment screw 72 for the spring 70, the tension at which cable is reeled in or payed out can readily be varied. It should also be indicated that since the rate at which the carriage 44 travels along guideway 46 is proportional to the rotational speed of the drum 28, the cable will always be wound in even multiple layers, regardless of the amount of cable which has already been wound on drum.

Now therefore I claim:

1. In a vehicle having an operating cable, the combination comprising: a winding reel adapted to have said cable wound thereon, a cable-guiding traverse mechanism including a carriage arranged for movement longitudinally of said reel, sensing means which is mounted on said carriage and functions to sense tension of said cable, control means which functions in response to said sensing means to cause said reel to wind in or pay out cable in response to, respectively, a decrease or an increase in cable tension, tubular resilient rod means cantilevered from said carriage to receive said cable therein and direct said cable through said carriage and onto said reel, and to compensate for momentary variations in cable tension.

2. In a vehicle having an operating cable, the combination, comprising: a winding reel adapted to have said cable wound thereon, a motor to cause said reel to wind in or pay out cable, a cable-guiding traverse mechanism providing a guideway extending longitudinally of said reel and a carriage mounted for movement back and forth on a path along the length of said guideway, a hydraulic pump driven by said reel, rod and piston means driven by said pump to move said carriage along said guideway, a reversing mechanism actuated by said carriage as it moves to each end of its back and forth path of travel along said guideway to cause said rod and piston means to move said carriage in the opposite direction from which it was moving just previously, a tubular flexible rod cantilevered from said carriage to receive said cable therein and direct said cable through said carriage and onto said reel, drag means mounted on said carriage to engage said cable and resist movement thereof at least when said cable is being wound onto said reel to place a predetermined tension on said cable, sensing means which is mounted on said carriage and having yielding means to deflect that portion of the cable reaching between said flexible rod and said reel, and control means responsive to said sensing means to cause said reel to wind in or pay out cable in response to respectively, a decrease or an increase in cable tension.

3. In a vehicle having an operating cable, the combination comprising: a winding reel adapted to have said cable wound thereon, a cable-guiding traverse mechanism including a carriage arranged for movement longitudinally of said reel, sensing means which is mounted on said carriage and functions to sense tension of said cable, control means which functions in response to said sensing means to cause said reel to wind in or pay out cable in response to, respectively, a decrease or an increase in cable tension, and drag means mounted on said carriage and acting on said cable at least when said cable is being wound onto said reel to place a predetermined tension on said cable as said cable is being wound onto said reel, said drag means comprising a pair of rollers engaging said cable and a pump operatively connected to at least one of said rollers to create a predetermined drag on said cable.

4. In a vehicle having an operating cable, the combination comprising: a winding reel adapted to have said cable wound thereon, a cable-guiding traverse mechanism including a carriage arranged for movement longitudinally of said reel, sensing means which is mounted on said carriage and functions to sense tension of said cable, control means which functions in response to said sensing means to cause said reel to wind in or pay out cable in response to, respectively, a decrease or an increase in cable tension, and drag means mounted on said carriage and acting on said cable at least when said cable is being wound onto said reel to place a predetermined tension on said cable as said cable is being wound onto said reel, said drag means comprising a pair of rollers engaging said cable and a power absorbing means operatively connected to at least one of said rollers to create a predetermined drag on said cable.

References Cited by the Examiner

UNITED STATES PATENTS

| 1,123,602 | 1/15 | Sessions | 242—86.51 |
| 1,160,857 | 11/15 | Coseo | 242—86.51 |
| 1,641,300 | 9/27 | Spencer | 242—158 |
| 2,303,847 | 12/42 | Lamond | 254—172 |
| 2,306,045 | 12/42 | Delano | 242—158.4 X |
| 2,443,028 | 6/48 | Edwards | 254—172 |
| 2,589,217 | 3/52 | Ball | 242—86.51 |
| 2,665,081 | 1/54 | Slomer | 242—86.51 |
| 2,759,684 | 8/56 | Cross | 242—86.51 |
| 3,061,236 | 10/62 | Lang | 242—158.4 |

FOREIGN PATENTS 176,324 10/06 Germany.

MERVIN STEIN, *Primary Examiner.*

RUSSELL C. MADER, *Examiner.*